(12) United States Patent
Petrovic

(10) Patent No.: US 6,176,369 B1
(45) Date of Patent: Jan. 23, 2001

(54) STEERABLE CARRIER PUCK

(75) Inventor: Zmaj Petrovic, Westmount (CA)

(73) Assignee: Gebo Conveyors, Consultants & Systems, Inc. (CA)

( * ) Notice: Under 35 U.S.C. 154(b), the term of this patent shall be extended for 0 days.

(21) Appl. No.: 09/168,782

(22) Filed: Oct. 8, 1998

(51) Int. Cl.[7] .................................................. B65G 37/00
(52) U.S. Cl. ............................. 198/867.11; 198/867.14; 198/803.14
(58) Field of Search ........................ 198/867.14, 867.11, 198/803.14

(56) References Cited

U.S. PATENT DOCUMENTS

| | | |
|---|---|---|
| 3,941,237 | 3/1976 | MacGregor, Jr. . |
| 4,159,762 * | 7/1979 | Bulworth ............................. 198/472 |
| 4,189,996 * | 2/1980 | Ackley, Sr. et al. .................. 101/37 |
| 4,664,248 | 5/1987 | Goodman, Jr. et al. . |
| 4,708,250 * | 11/1987 | Van Der Schoot .................. 209/592 |
| 4,729,413 | 3/1988 | Shults . |
| 4,778,045 | 10/1988 | Grune et al. . |
| 4,807,421 | 2/1989 | Araki et al. . |
| 5,479,762 | 1/1996 | Bliss . |
| 5,484,052 * | 1/1996 | Pawloski et al. ............... 198/803.01 |
| 5,509,524 * | 4/1996 | Ohmori et al. .................... 198/465.1 |
| 5,564,551 | 10/1996 | Schmitt . |
| 5,579,696 | 12/1996 | Cockayne . |
| 5,769,203 * | 6/1998 | Sala ...................................... 198/397 |
| 5,941,366 * | 8/1999 | Quinlan et al. ................... 198/465.1 |

* cited by examiner

*Primary Examiner*—Christopher P. Ellis
*Assistant Examiner*—Rashmi Sharma
(74) *Attorney, Agent, or Firm*—Andrus, Sceales, Starke & Sawall, LLP

(57) ABSTRACT

There is provided a carrier puck for movement on a conveying circuit comprising at least one conveyor having lateral guides including at least two vertically spaced and distinct lateral guide plates adapted to slidably engage a distinct portions of said carrier puck to temporarily prevent rotation of said carrier puck while advancing on said conveying circuit. The carrier puck preferably comprises a rounded main body suitable for bulk conveying. Preferably, the carrier puck is manufactured by injection molding of separate parts, later assembled.

19 Claims, 5 Drawing Sheets

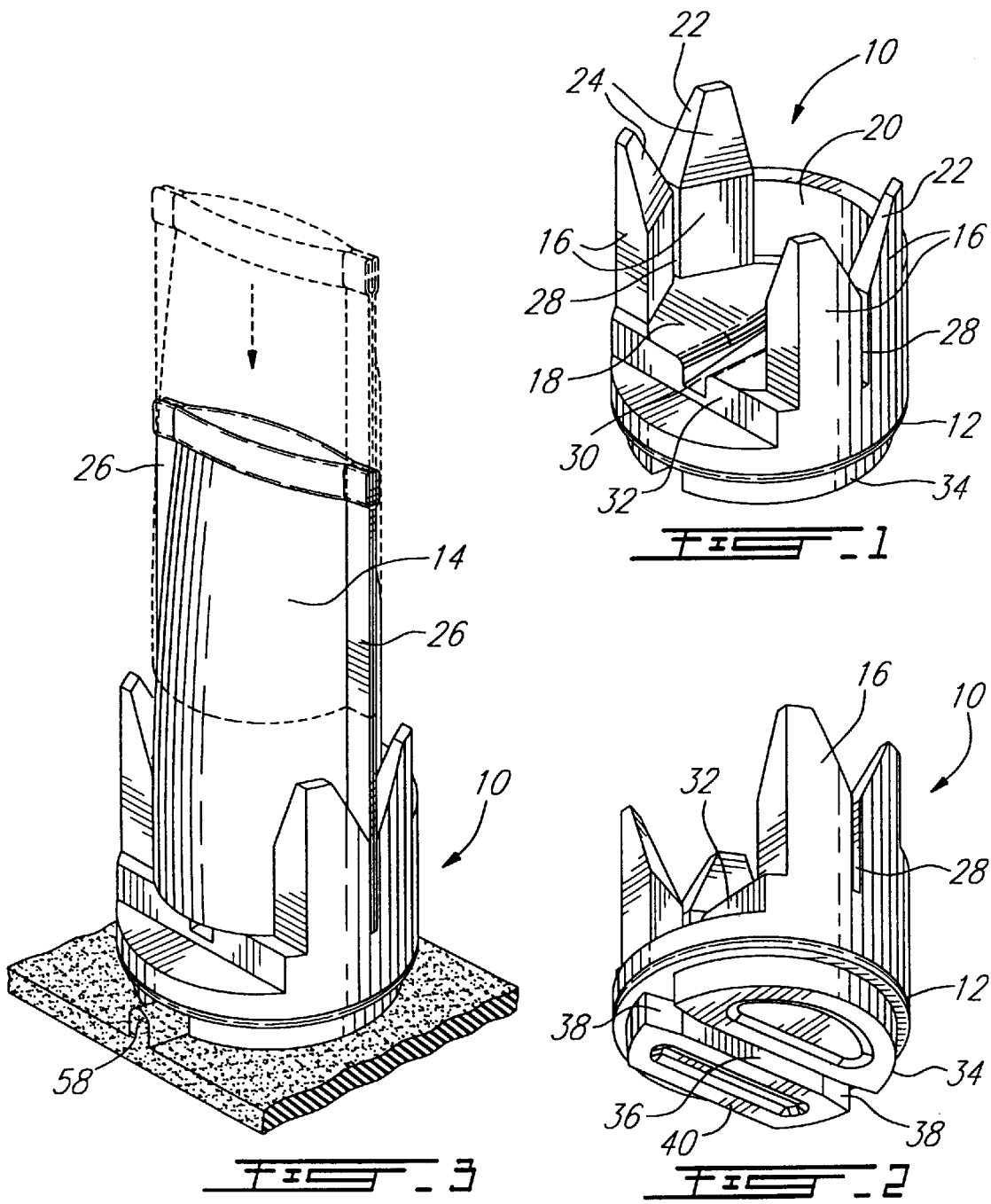

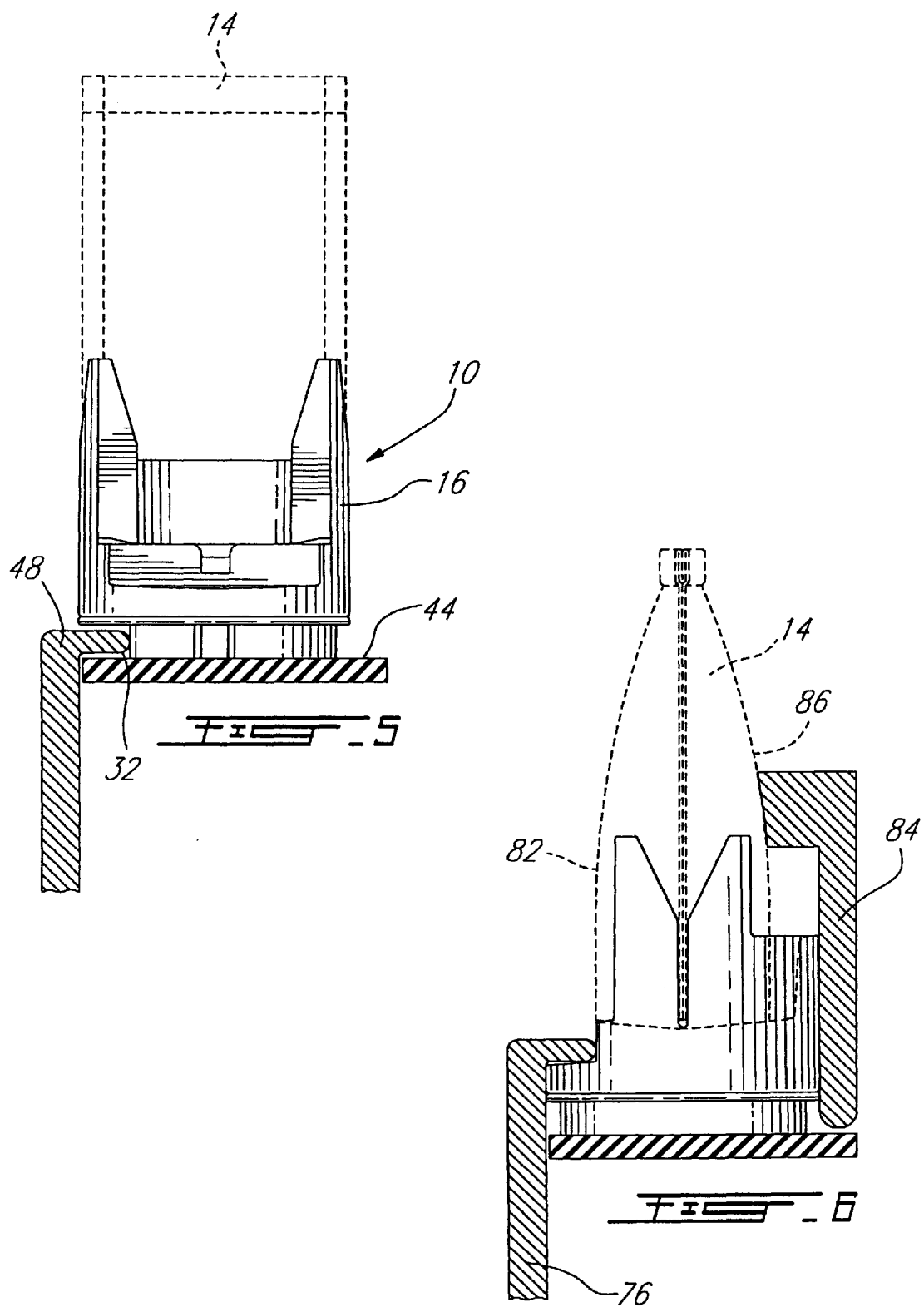

STEERABLE CARRIER PUCK

TITLE OF THE INVENTION

Steerable Carrier Puck

FIELD OF THE INVENTION

The present invention pertains to carrier pucks for receiving and supporting objects to be moved onto conveyors along a production line. More specifically, the present invention is concerned with a carrier puck that can be positioned and maintained in predetermined rotational orientations on conveyors along a production line.

BACKGROUND OF THE INVENTION

Carrier pucks are well known in the manufacturing and packaging industries. Their primary use is to support and stablize objects while moving along a production line. Carrier pucks are also very useful to protect fragile objects from collision during conveying.

A convenient way to convey carrier pucks is to move them in bulk between the stations of the assembly line. The main reason to convey puck in bulk is to allow the pucks to accumulate between each station. In doing this, the line can be kept running even though one or more stations are down because of jamming, repairs, or the like.

Bulk conveying is preferably done using round pucks. A round causes minimal surface contact to other similar pucks, minimizing friction and allowing bulk conveying while preventing jamming along the production line.

U.S. Pat. No. 4,664,248, entitled "Device and Method for Conveying and Orienting Randomized Circular Product-Carrying Pucks", issued to Goodman, Jr. et al. on May 12, 1987, discloses a generally round carrier puck. The round puck has two distinct outer contacting surfaces. A first surface which is round and toothed and a second slide surface which is cut flat in an arc of circumference. As the puck travels on the conveying surface it will encounter a toothed side guide which engages the toothed round portion of the puck thus imparting rotation of the puck until it reaches the flat surface which will stop rotation and cause the puck to slide forward in the direction of travel of the conveyor. A drawback of this arrangement is that the puyck can only be oriented in one preferred direction (or at 180° from the preferred direction). Another drawback is that a pucks according to that invention cannot easily be spaced apart from one another.

U.S. Pat. No. 5,479,762, issued on Jan. 2nd of 1996 to Bliss and entitled "Carrier Puck", discloses a rectangular carrier puck having lateral ears which fit recesses in the conveyor belt. The ears-recesses system restrains the puck movement allowing the pucks to be correctly oriented and equally spaced along the conveyor. However, a major drawback of such arrangement is that it is unsuitable for bulk conveying.

U.S. Pat. No. 5,484,052, issued to Pawloski et al. on Jan. 16, 1996 and also entitled "Carrier Puck", describes a carrier puck having a rectangular base and a cylindrical top. The puck is shaped to receive either a first or a second article having different dimensions and shape. The rectangular base allows the puck to be oriented in four quadrants (90° increments) by sliding on conveyor lateral guides. However, since the base in rectangular, it is not possible to know in which quadrant the puck is oriented with additional data. Such data is obtained by four recesses with one recess located in each quadrant of the cyclindrical sides of the puck allowing mechanical sensors mounted to a conveyor to sense when the puck is properly oriented to receive either the first or the second articles. An important drawback is the lack of control over the quadrant orientation of the puck. Once the puck is in a given orientation, it will continue that way.

OBJECTS OF THE INVENTION

An object of the present invention is therefore to provide a steerable carrier puck which is suitable for bulk conveying and which avoids the drawbacks of the prior art.

A further object of the present invention is to provide a carrier puck manufactured to a precise weight tolerances so as to provide exact weight readings on the load of a loaded carrier puck by weighing the loaded carrier puck and subtracting the known weight of the empty carrier puck.

A further object of the present invention is to provide a carrier puck of a diameter similar to the size of the object being conveyed.

A further object of the present invention is provide a two-piece assembled carrier puck with interchangeable top and interchangeable bottom portions.

SUMMARY OF THE INVENTION

More specifically, in accordance with the present invention, there is provided a carrier puck for movement on a conveying circuit comprising at least one conveyor having lateral guides including at least two vertically spaced and distant lateral guide plates adapted to slidably engage a distinct portion of said carrier puck to temporarily prevent rotation of said carrier puck while advancing on said conveying circuit;

said carrier puck comprising a main body having a rotational axis, said main body comprising:
an open top for receiving at least one object to be conveyed,
a conveyor-contacting bottom portion,
a round peripheral rim centered about said rotational axis, and
an outer wall surface comprising the round peripheral rim and extending between the top and bottom portions of said carrier puck, said outer wall having at least two guide-contacting portions configured and sized to selectively and slidably engage at least one of said lateral guide plates on said conveying circuit; each said guide-contacting portions defining a specific angle about said rotational axis;

whereby when said carrier puck is in rotation about said rotational axis, said carrier puck is oriented and maintained in a desired position when a given guide-contacting portion slidably engages the guide plate configured and sized to slidably engage the given guide-contacting portion.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 is a perspective view of the carrier puck of the present invention;

FIG. 2 is a perspective view of the carrier puck of FIG. 1 showing the base of the puck;

FIG. 3 is a perspective view of the carrier puck of FIG. 1 on a portion of a conveyor belt with tongues;

FIG. 5 is a cross sectional view taken along section line 5—5 of FIG. 4;

FIG. 6 is a cross sectional view taken along section line 6—6 of FIG. 4;

DETAILED DESCRIPTION OF THE INVENTION

Figure 4:
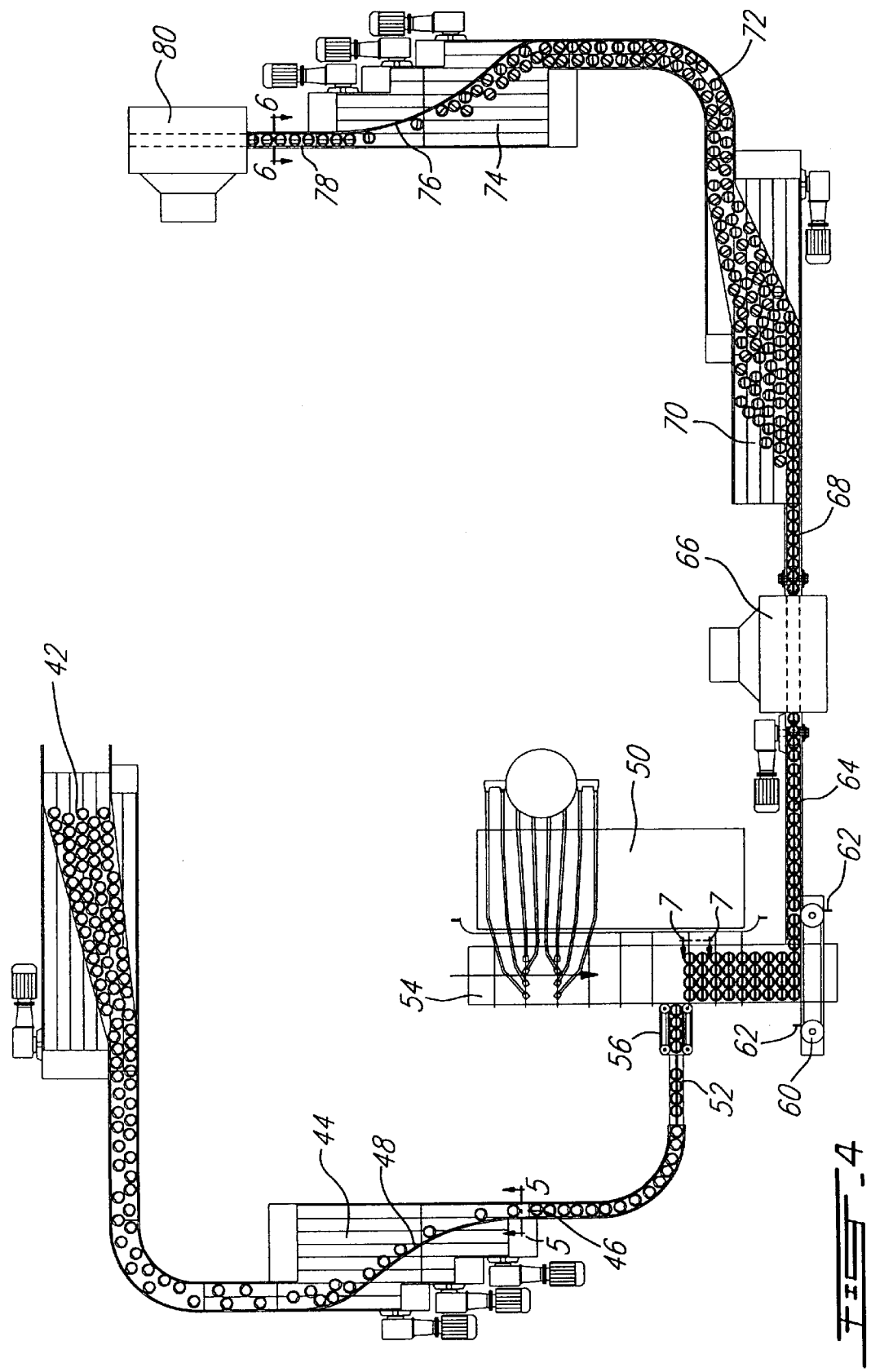
FIG. 4 is a top plan view of a conveyor system using a carrier puck according to an embodiment of the present invention.

Referring to FIGS. 1 and 2, there is shown a preferred embodiment of the carrier puck of the present invention. Carrier Puck 10 is provided with a generally round outer rim 12 to minimize frictional contact and jamming with contiguous carrier pucks travelling on a conveying circuit. In this preferred embodiment, carrier puck 10 is adapted to carry pouches 14 which will be deposited therein as shown in FIG. 3. In operation, pouches 14 may be held above and dropped into pucks 10. The central opening of puck 10 is delimited by two pairs of fingers 16, floor 18 and rear wall 20.

Fingers 16 are provided with ends having angled surfaces 22 and 24 so as to guide pouch 14 in its descent into puck 10 and to tolerate slight misalignments of pouches 14 in relation to pucks 10 when pouches 14 are dropped into pucks 10.

In the particular embodiment illustrated in FIG. 3, pouch 14 is provided with generally flat edges 26. These edges 26 are capable of sliding in puck 10 by descending in the vertical groove 28 provided between each pair of fingers 16. Thus, once pouch 14 is positioned in puck 10, it will be securely held by edges 26 being positioned in grooves 28.

A distinct advantage of cutting groove 28 between fingers 16 is to minimize the overall diameter of puck 10. This allows puck 10 to carry a pouch 14 which is of nearly equal width. Such design is advantageous since it allows a greater number of pucks to travel on a given surface area of a conveying circuit. In addition, such design minimizes material use when manufacturing puck 10.

Floor 18 is angled towards a central drainage channel 30 and away from rear wall 20 so as to allow washing, rinsing and drainage of pucks 10 even when carrying pouches 14. It is to be noted that in this particular embodiment, pouches 14 carried on pucks 10 do not touch rear wall 20 so as to facilitate washing operations and to facilitate retrieval of pouches 14 from pucks 10 at the end of the conveying circuit. Indeed, rear wall 20 is sufficiently spaced from pouch 14 so as to allow the descent of a gripping claw (not shown) to the base of pouch 14 to ensure a positive retrieval of pouch 14.

Continuing with the description of puck 10, functional features allowing puck 10 to be steerable will now be described in more detail. Still referring to FIGS. 1 and 2, puck 10 is provided with a flat slide portion 40. Puck 10 is provided with a generally round base 34 separated by a central groove 36 having slightly open leading edges 38. In addition, base 34 is provided with flat slide portion 40 which is orthogonal to flat 32. Flats 32 and 40 are used to maintain a chosen rotational orientation to puck 10 about its rotational axis during its travel on a conveying circuit. The operation of flats 32, 40 and groove 36 will be described in more detail herein below by reference to FIGS. 4 to 7.

FIG. 4 illustrates a typical conveying circuit. Empty pucks 10 are loaded off pallets and onto bulk feed conveyor 42. Pucks 10 will then be placed in single file on combiner 44. Combiner 44 is provided with a lateral guide 48 against which pucks 10 are guided toward single file track 46. Lateral guide 48 is shown on FIG. 5. Pucks 10 will contact lateral guide 48 with their base and rotate on guide 48 until their rotation reaches flat surface 40. From that point on, pucks 10 will stop rotating and continue to advance on the conveying surface of combiner 44 while flat surface 40 slides on lateral guide 48. This positively steers and orients pucks 10 in a common position for receiving pouches 14 at filling station 50.

In a most preferred embodiment, combiner 44 is a multi-track combiner with an increasing gradient of speed leading to higher speed single track 46 as described in co-pending and commonly assigned Canadian patent application serial no. 2,188,735 filed on Oct. 24, 1996. However, combiner 44 may also be of standard design with constant speed track. In both cases, lateral guide 48 will cause pucks 10 to rotate until locking their rotational orientation by sliding engagement of flat surface 40 on lateral guide 48.

It is to be understood that the combining operation on combiner 44 and the orientation feature of lateral guide 48 can be accomplished as two separate functions. Pucks 10 could be first combined in single file and later oriented by contacting lateral guide 48 located downstream from combiner 44.

Figure 7:
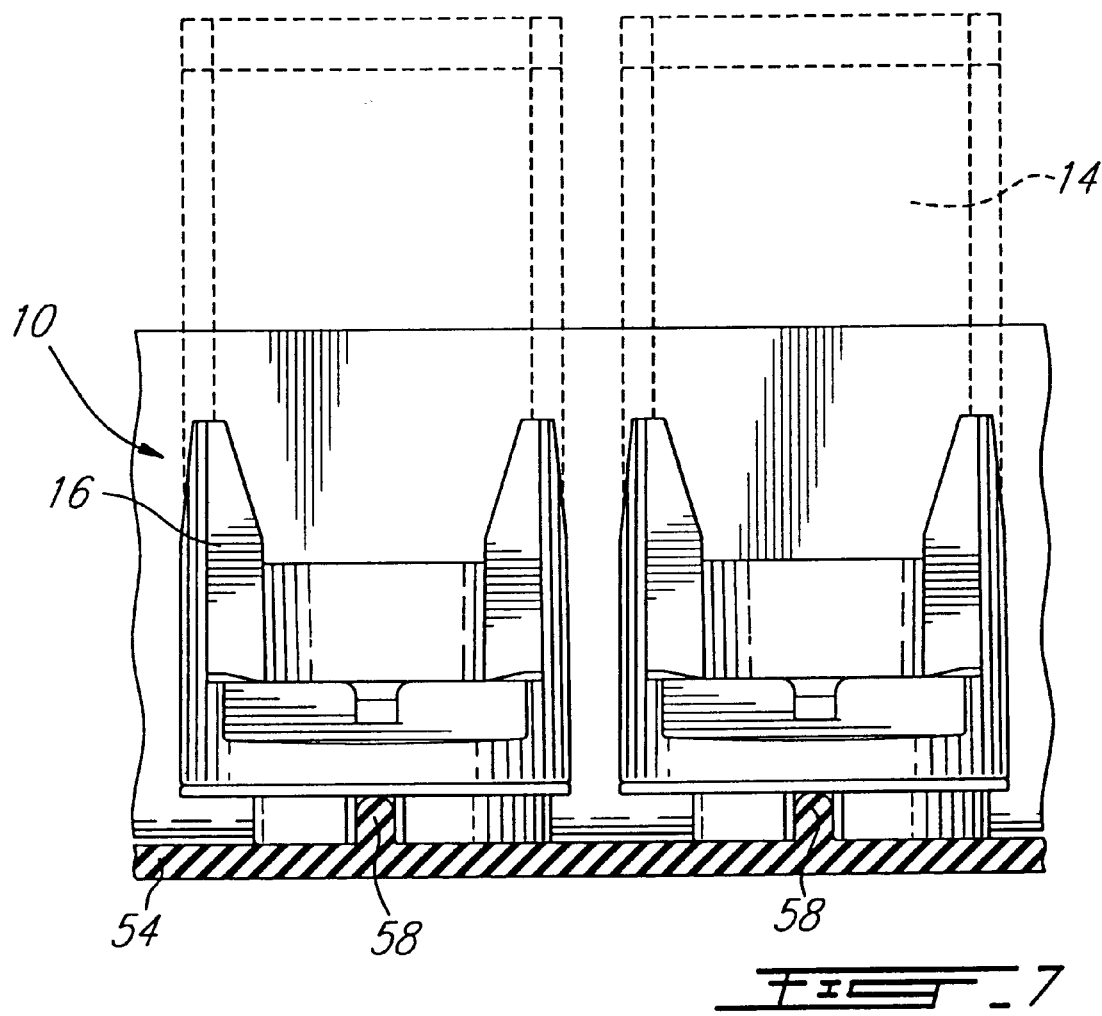
FIG. 7 is a cross sectional view taken along section line 7—7 of FIG. 4.
Figure 8:
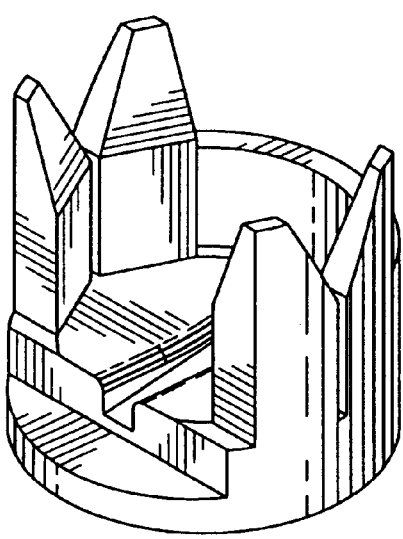
FIGS. 8 and 9 are perspective views of the top portion of a two-piece assembled puck in accordance with the present invention.
Figure 9:
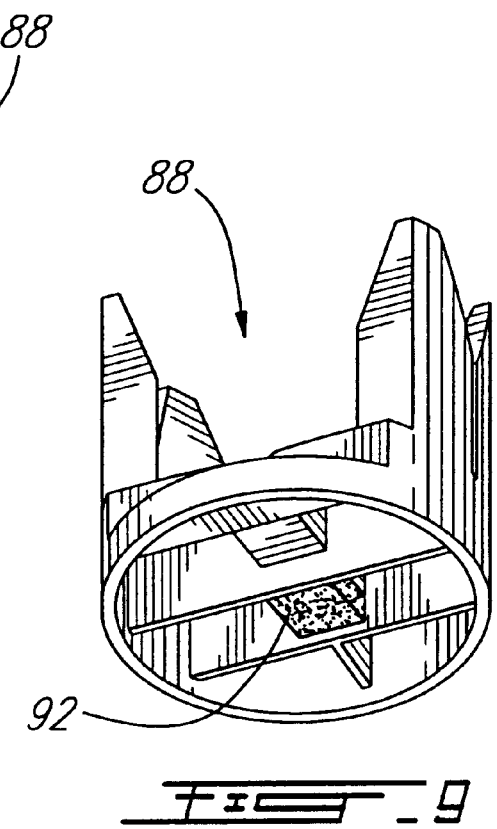
Figure 10:
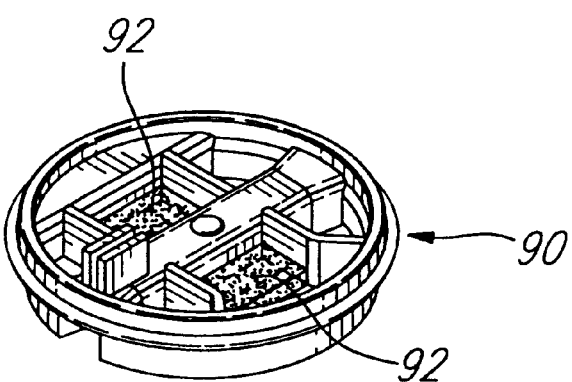
FIGS. 10 and 11 are perspective views of the bottom portion of a two-piece assembled puck in accordance with the present invention.
Figure 11:
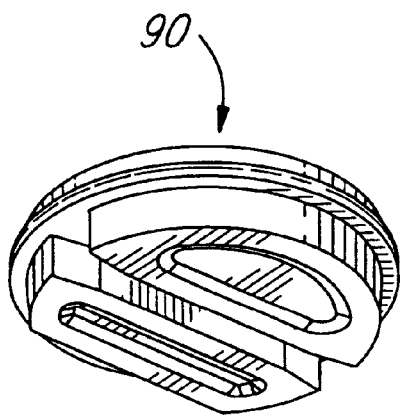

Hence, pucks 10, are guided on single file conveying track 46 until reaching a sliding chute 52 where pucks are held in lateral contact while maintaining the rotational orientation given by lateral guides 48. Pucks 10 are then pushed, four at a time, onto a belt conveyor 54 by belt driven lateral guides 56. Belt conveyor 54 is provided with regularly spaced tongues 58, orthogonal to the belt and adapted to slidably engage groove 36 in the base of pucks 10 as shown in FIG. 7. As previously mentioned, groove 36 is slightly flared as shown by numeral 38 to allow slight initial misalignment of groove 36 and tongues 58. Belt conveyor 54 is moved forward in a stop and go fashion, preferably by a step motor, to allow pouches 14 to be suspended above and dropped, four at a time and according to a timed sequence, into pucks 10 by filler apparatus 50 which drops pouches 14. When dropped, each pouch 14 of course will have the same spatial orientation so that it may fit the top opening of puck 10. It is to be noted that in this arrangement, slide surface 40 on puck 10 allows rotational alignment of puck 10 so that groove 36 can engage tongue 58. Indeed, slide surface 40 and groove 36 are parallel.

Once pucks 10 are loaded with pouches 14, these exit from belt conveyor by sequentially push from lateral belt conveyor 60 provided with projecting baffles 62 which push pucks 10, four at a time, onto single file conveyor 64 in unison with the filling rate of filler apparatus 50.

Once on conveyor 64, the pucks are weighed on weight station 66. Any pucks 10 which failed to receive a pouch 14 or which have underfilled or overfilled pouches 14 are sorted away from conveying line 68.

Line 68 leads to an accumulation conveying area 70 where bulk advancement of pucks 10 is achieved. Those skilled in the art will immediately understand that accumulation areas are very useful in a conveying circuit since they allow upstream and downstream apparatus to be temporarily down without having to shut down the entire conveying circuit.

A bulk flow of loaded pucks 10 then enters a combiner 74 similar to combiner 44 described above with the exception that lateral guide 76 is vertically spaced from lateral guide 48 and is adapted to functionally interact with flat surface 32 which is also vertically spaced form flat surface 40. This allows lateral guide 76 to slidably engage flat surface 32 thereby locking the rotational orientation of pucks 10 as these move to single file conveyor 78 as shown in FIG. 6.

Pucks 10 then enter processing apparatus 80 in which an article such as a label or a straw is affixed to front surface 82 of pouch 14. Back guide 84 prevents puck 10 from tipping over while the article is affixed to pouch 14. Back guide 84 may also prevent deformation of pouch 14 while the article is affixed to pouch 14.

Pucks 10 are then routed to an unloading station (not shown) where pouches 14 are removed from pucks 10 by gripping arms which descend and grip pouches 14 by their front surface 82 and rear surface 86 and are placed in cartons. To precisely position pucks 10 below gripping arms, a screw type conveyor is preferred (not shown). This will advance pucks 10 while maintaining a constant space between each puck. Rear wall 20 on pucks 10 allows the screw type conveyor to positively advance pucks 10. Of course, the movement and pace of the gripping arms will be synchronized to the advancing pucks 10.

It is of great importance to note that the number and placement of slide surfaces such as 32 and 40 is quasi infinite. To provide a specific rotational orientation to pucks 10, a slide surface must simply be vertically spaced apart from other slide surfaces on puck 10. This allows a large number of possible unique orientations for pucks 10 thereby allowing precise operations to be performed on the pouches carried by pucks 10. For example, separate distinct front and back labels and could be affixed to pouches 14 followed by the gluing on of a drinking straw. For each slide surface on puck 10, a matching slide guide can be installed on the conveying circuit thereby rendering pucks 10 steerable in a multitude of desired rotational orientation so that processing steps may be completed while knowing the exact rotational orientation of pucks 10.

Incidentally, although in a preferred embodiment pouches 14 contain liquids such as juices and fruit cocktails, the pouch could also carry dairy products or even solid particulate items such as coffee.

Also, although the preferred embodiment has been described as a pouch conveying puck, puck 10 can be readily designed to accommodate other articles, while still having the above mentioned characteristics. The configuration and size of the conveying circuit and of puck 10 may then vary to accommodate the size and shape of the object to convey or the accommodate the nature of the operation performed at each station.

It is important to note that pucks 10 can be molded in one piece or can be assembled from separate parts. The preferred material from which the puck can be made is polypropylene, but other shock resisting materials, such as polyurethane or rubber are acceptable.

Referring now to FIGS. 8 to 11, in a most preferred embodiment, pucks 10 are constructed of two parts, namely a top 88 and a base 90. This allows various tops and bases to be interchangeable depending on the specific article being conveyed and depending on the orientation required for pucks 10 throughout the conveying circuit. Another advantage of the two piece construction is the ease of injection molding wherein the top 88 and base 90 can be hollow thereby minimizing use of material and minimize cooling time after molding. A further advantage is that the inside hollow portions of top 88 and base 90 can be provided with trimmable projections (not shown) or stabilization weights 92 so as to obtain a precise and constant weight of pucks 10 prior to sealing together top 88 and base 90. Exact weight pucks allow for precise weight measurement of pouches 14 once dropped onto pucks 10. The precise weight of pouches 14 is obtained by simply subtracting the known weight of an empty puck 10 from the total measured weight of a puck 10 loaded with a pouch 14. Ideally, top 88 and base 90 are sealed by ultrasonic welding. Pressure, snap, adhesive or frictional fits are also contemplated. Of course, puck 10 can be constructed of more than two pieces. Once assembled and sealed, puck 10 can be used for handling food or beverage preparations. The weights 92 which may be present inside puck 10 will not be in contact with food or beverage preparations.

It is also interesting to note that once pucks 10 are loaded with pouches 14, a variety of such conveying circuit may be merged into a common conveying circuit until sorting of the pucks is required. For example, three filling stations similar to filling station 50 may separately fill pouch with apple, orange and grape juices. The streams of loaded pucks can be merged into a common stream for weighing or other operations. At the end the pucks may be sorted through a sequence of combiners having selective lateral guides vertically spaced from each other and capable of engaging matching flat surfaces on the pucks so as to obtain a sorting effect.

Although the present invention has been described herein above by way of preferred embodiments thereof, it can be modified, without departing from the spirit and nature of the subject invention as defined in the appended claims.

What is claimed is:

1. A carrier puck for movement on a conveying circuit comprising at least one conveyor having lateral guides including at least two vertically spaced and distinct lateral guide plates adapted to selectively and slidably engage a distinct portion of said carrier puck to temporarily prevent rotation of said carrier puck during its advancement on said conveying circuit;

said carrier puck comprising a main body having a rotational axis, said main body comprising:
an open top for receiving at least one object to be conveyed, said open top being provided with a progressively narrowing central opening defined by inner side walls and a floor, said central opening being configured and sized to receive said object being deposited in said opening despite partial misalignment of said object during its descent into said opening, said progressively narrowing central opening being adapted to urge said article into required alignment on the floor of said opening,
a conveyor-contacting bottom portion,
a round peripheral rim centered about said rotational axis, and
an outer wall surface comprising the round peripheral rim and extending between the top and bottom portions of said carrier puck, said outer wall having at least two vertically-spaced guide-contacting portions configured and sized to selectively and slidably engage at least one of said lateral guide plates on said conveying circuit; each said guide-contacting portions defining a specific angle about said rotational axis;

whereby when said carrier puck is in rotation about said rotational axis, said carrier puck is oriented and maintained in a desired position when a given guide-contacting portion slidably engages the guide plate configured and sized to slidably engage the given guide-contacting portion.

2. A carrier puck as in claim 1, wherein said puck comprises two orthogonal guide-contacting portions.

3. A carrier puck as in claim 1, wherein said puck is provided with a grooved bottom configured and sized to slidably engage a tongued conveyor belt on said conveying circuit.

4. A carrier puck as in claim 3, wherein said groove is provided with flared end openings to facilitate the engagement of said tongue in said groove.

5. A carrier puck as in claim 1, wherein said object is a deformable pouch and said open top is configured and sized to receive said pouch.

6. A carrier puck as in claim 5 wherein said deformable pouch contains a liquid.

7. A carrier puck as in claim 6 wherein said pouch contains a beverage.

8. A carrier puck as in claim 5 wherein said pouch contains a particulate solid.

9. A carrier puck as in claim 5, wherein said pouch is provided with a front face and a rear face held together by opposite lateral pinched edges; said open top being provided with a progressively narrowing central opening defined by inner side walls and a floor, said opening being configured and sized to receive said pouch being deposited in said opening, said opening comprising a pair of opposite vertical grooves configured and sized to receive said lateral pinched edges of said pouch during its descent into said opening.

10. A carrier puck as in claim 9 wherein said floor is sloped towards one side of said carrier puck so as to allow drainage during washing and rinsing operations.

11. A carrier puck as in claim 10 wherein said floor is provided with a drainage channel.

12. A carrier puck as in claim 9 wherein said vertical grooves extend through said inner side walls to reach said outer wall so as to accommodate pouches having diameters nearly equal to the diameter of said carrier puck.

13. A carrier puck as in claim 12 wherein said vertical grooves extend through both side walls and define around said central opening two pairs of opposite fingers configured and sized to receive said pouch when deposited therein.

14. A carrier puck as in claim 13 further comprising in said outer wall a recessed portion located between said pairs of opposite fingers and allowing access to production equipment to the face of said pouch.

15. A carrier puck as in claim 14 further comprising in said outer wall a rear wall portion located opposite of said recessed portion, said rear wall portion allowing said carrier puck to be engaged and advanced by a screw conveyor.

16. A carrier puck as in claim 1 wherein said carrier puck main body comprises an assembly of at least two hollow injection molded pieces, said pieces including a top piece having an open top for receiving at least one object to be conveyed and a bottom piece comprising a conveyor-contacting bottom portion.

17. A carrier puck as in claim 16 wherein said top piece is interchangeable with other top pieces to allow the same bottom piece to carry various top pieces shaped and sized for receiving distinctly shaped objects to be conveyed.

18. A carrier puck as in claim 16 wherein said bottom piece is interchangeable with other bottom pieces to allow the same top piece to carry various bottom pieces shaped and sized to interact with said conveying circuit so as to achieve temporary rotational orientation of said puck as it advances on said conveying circuit.

19. A carrier puck as in claim 16 wherein at least one of said hollow injection molded pieces comprise, in their hollow portions calibration weights so that carrier puck weight may be calibrated within chosen weight tolerances prior to assembly of said pieces.

* * * * *